(12) United States Patent
Nieves

(10) Patent No.: US 9,113,336 B2
(45) Date of Patent: Aug. 18, 2015

(54) SOFTWARE APPLICATION FOR INTERCEPTING PHONE CALL AND TEXT MESSAGES FROM SPECIFIC CONTACTS

(71) Applicant: Luis Nieves, Clearwater, FL (US)

(72) Inventor: Luis Nieves, Clearwater, FL (US)

(*) Notice: Subject to any disclaimer, the term of this patent is extended or adjusted under 35 U.S.C. 154(b) by 0 days.

(21) Appl. No.: 14/184,695

(22) Filed: Feb. 19, 2014

(65) Prior Publication Data

US 2014/0235204 A1 Aug. 21, 2014

Related U.S. Application Data

(60) Provisional application No. 61/766,540, filed on Feb. 19, 2013.

(51) Int. Cl.
*H04W 12/08* (2009.01)
*H04L 12/58* (2006.01)

(52) U.S. Cl.
CPC ............... *H04W 12/08* (2013.01); *H04L 51/12* (2013.01); *H04L 51/38* (2013.01)

(58) Field of Classification Search
CPC ........ H04W 12/08; H04L 51/12; H04L 51/38
USPC .............. 455/466, 410–411, 445, 414.1, 417, 455/415, 565, 567; 379/142.05
See application file for complete search history.

(56) References Cited

U.S. PATENT DOCUMENTS

| | | | |
|---|---|---|---|
| 2007/0011235 A1* | 1/2007 | Mutikainen et al. | 709/204 |
| 2009/0124270 A1* | 5/2009 | Kelley | 455/466 |
| 2011/0211682 A1* | 9/2011 | Singh et al. | 379/142.05 |
| 2011/0283349 A1* | 11/2011 | Wu | 726/11 |
| 2012/0028606 A1* | 2/2012 | Bobotek | 455/411 |
| 2014/0105373 A1* | 4/2014 | Sharpe | 379/142.05 |
| 2014/0128047 A1* | 5/2014 | Edwards et al. | 455/415 |

* cited by examiner

*Primary Examiner* — Brandon Miller

(57) ABSTRACT

A method for a software application is used to intercept unwanted phone calls or text messages for a cellular phone. The software application allows a user to manage their blacklist, which contain contacts that the user does not want to communicate with. When the software application receives an incoming or outgoing communication with a telephone number, the software application will compare that telephone number with the telephone numbers of the contacts on the blacklist. If the telephone number of the incoming or outgoing communication matches one of the telephone numbers in blacklist, the incoming or outgoing communication is blocked from its intended destination. The software application will then send an audio or textual intercept message to the sender of the incoming or outgoing communication.

18 Claims, 7 Drawing Sheets

SOFTWARE APPLICATION FOR INTERCEPTING PHONE CALL AND TEXT MESSAGES FROM SPECIFIC CONTACTS

The current application claims a priority to the U.S. Provisional Patent application Ser. No. 61/766,540 filed on Feb. 19, 2013.

FIELD OF THE INVENTION

The present invention generally relates to intercept messages on incoming calls for landline phones. More specifically, the present invention is used to screen and filter telephone calls and text messages from blacklisted contacts.

BACKGROUND OF THE INVENTION

An intercept message is a telephone recording informing the caller that the call cannot be completed, for any of a number of reasons ranging from local congestion, to disconnection of the dialed phone, or network trouble along the route. An analog landline element known as "Intercept Messages" is integrated on a digital level with the present invention through an application at the user's discretion on incoming/outgoing calls and SMS/MMS messages for mobile devices.

Spam, whether through phone calls or SMS services, is an unfortunately common occurrence in the modern world. Many persons receive unwanted calls and texts, despite the existence of registries such as the "do not call" list. There exists a need for an application that can intercept spam before the spam is present to a user. There exists a further need for parents and businesses to filter the outgoing calls and texts from the phones of their children and employees, respectively.

DETAILED DESCRIPTIONS OF THE INVENTION

All illustrations of the drawings are for the purpose of describing selected versions of the present invention and are not intended to limit the scope of the present invention.

The present invention is software application that is capable of intercepting unwanted phone calls and text messages from specific contacts. The preferred embodiment of the present invention is run on a smart-phone, but the present invention can also run on other kinds of electronic communication devices. A user interacts with the present invention by means of a user account. The present invention provides the user account with a blacklist, which is a plurality of contacts that the user does not want to communicate with in some form or another. The present invention stores identification information, such as a full name, and a telephone number for each of the plurality of contacts. The present invention will work with the call manager interface and the text manager interface of the user's electronic communication device in order to filter and prevent unwanted phone calls and text messages. The call manager interface allows the user to interact with the calling features of the electronic communication device, and the text manger interface allows the user to interact with the SMS text features of the electronic communication device.

Once the present invention is installed onto the user's electronic communication device, the present invention will execute an overall process in order to screen and filter incoming and outgoing communications by using the blacklist. The overall process begins by prompting the user to manage the blacklist by either adding new contacts or deleting current contacts. In addition, the present invention prompts the user to designate a restriction status for each of the plurality of contacts on the blacklist. The restriction status describes what kinds of communication are allowed with a specific contact. In the preferred embodiment of the present invention, the restriction status for each contact can be either no-texts access, no-calls-and-texts access, no-calls access, or full access. No-texts access prevents the user account from receiving or transmitting short message service (SMS) texts to a specific contact. No-calls-and-texts access prevents the user account from receiving or transmitting SMS texts and telephone calls to a specific contact. No-calls access prevents the user account from receiving or transmitting just telephone calls to a specific contact. Full access allows the user account to receive and transmit all SMS texts and telephone calls to a specific contact.

Figure 1:
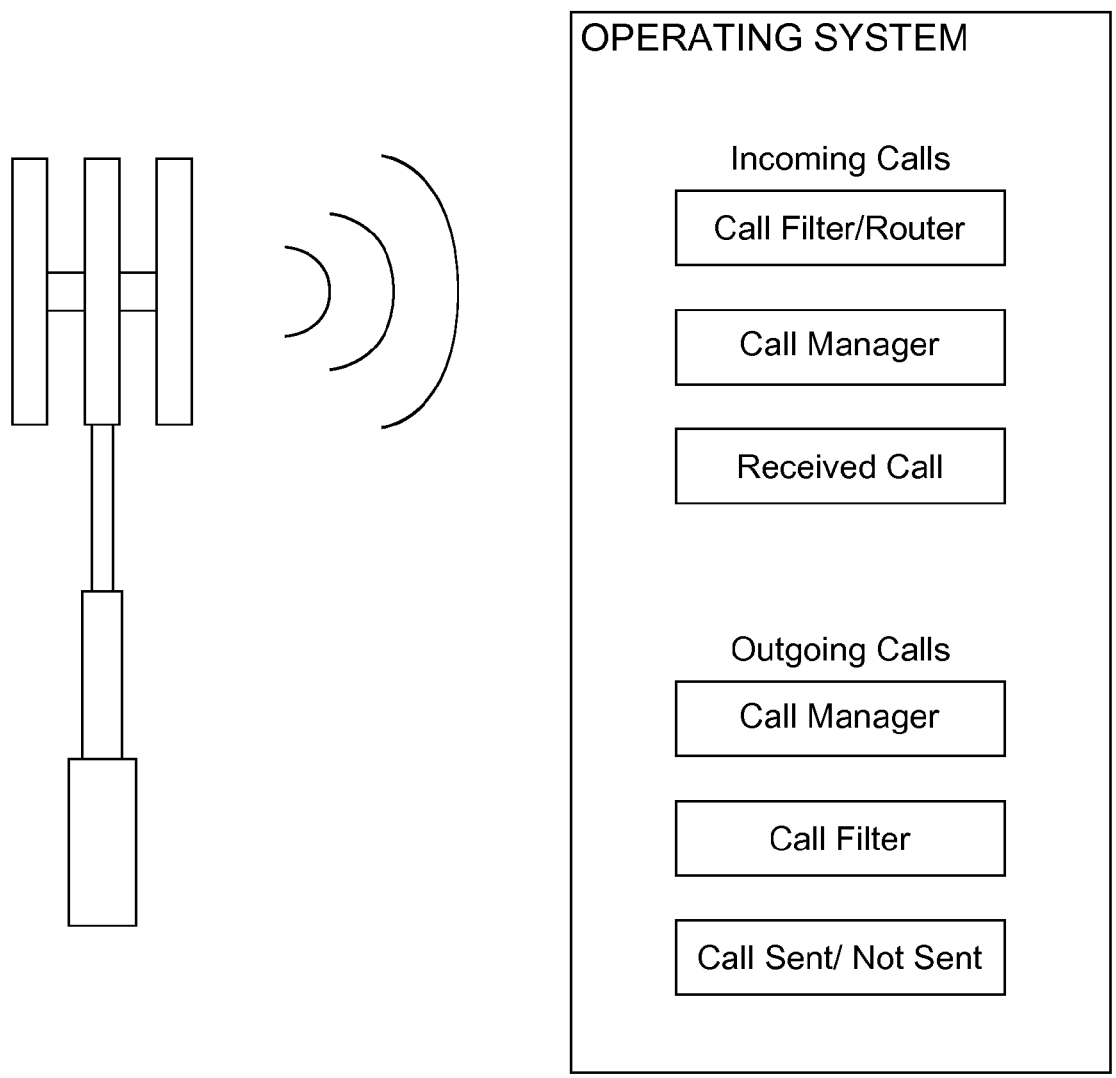
FIG. 1 is a block diagram showing which system components of the present invention are used to handle incoming and outgoing calls.

As can be seen in FIG. 1, the overall process includes a set of steps to manage an incoming communication to the user's portable computing device. The incoming communication can either be a telephone call or a text message that is received from a cell tower. The present invention will receive the incoming communication from an incoming telephone number. The incoming telephone number is the telephone number used by the sender to make the incoming telephone call. The present invention will then compare the incoming telephone number against the telephone number of each of the plurality of contacts in order to find a matching contact on the blacklist. The matching contact should identify the sender of the incoming communication. Next, the present invention will deny access to the incoming communication, if the designation for the matching contact's restriction status does not allow for the incoming communication. Finally, the present invention will send an access-denial notification for the incoming communication to the incoming telephone number so that the sender is informed that their incoming communication was not received by the user. The manner in which the access-denial notification is sent to the incoming telephone number depends on whether the incoming communication is a telephone call or a text message.

Figure 3:
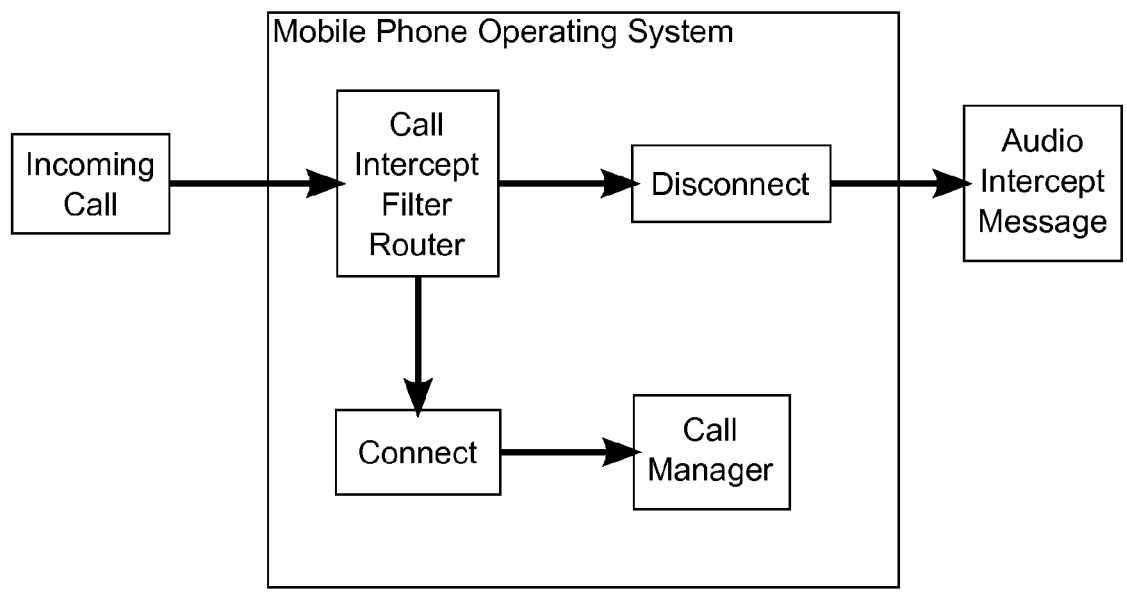
FIG. 3 is a flowchart describing the process of handling incoming calls.

As can be seen in FIG. 3, the overall process is modified by the present invention in order to specifically manage an incoming telephone call as the incoming communication. The present invention will disconnect the user account from the incoming telephone call before the incoming telephone call reaches the call manager, if the restriction status for the matching contact is designated as either no-calls-and-texts access or no-calls access. Consequently, if the user account is disconnected from the incoming telephone call, then the present invention will send an audio intercept message to the incoming telephone number. The audio intercept message can be sent either from the user's electronic communication device or through an external server. In addition, the audio intercept message contains the access-denial notification so that the sender can hear the access-denial notification as their telephone call is disconnect from the user's electronic communication device. Alternatively, the present invention will connect the user account to the incoming telephone call, if the restriction status of the matching contact is designated as full access. Consequently, if the user account is connected to the incoming telephone call, the present invention will route the incoming telephone call to the call manager interface so that user can talk and listen to the sender during the length of the call.

Figure 5:
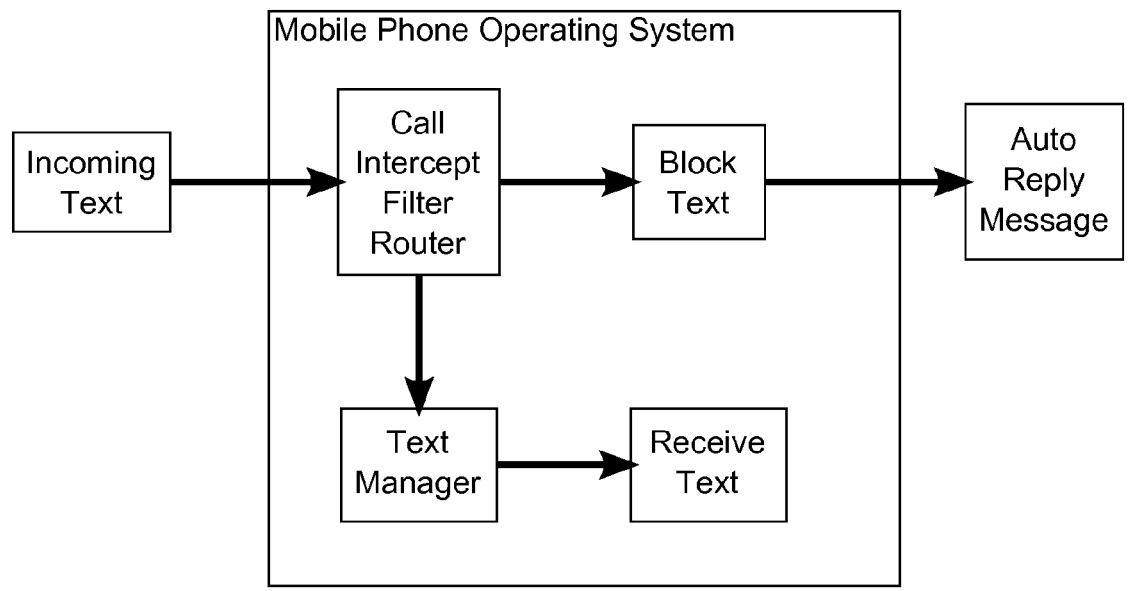
FIG. 5 is a flowchart describing the process of handling incoming text messages.

As can be seen in FIG. 5, the overall process is also modified by the present invention in order to specifically manage an incoming text message as the incoming communication. The present invention will block the user account from viewing the incoming text message before the incoming text message reaches the text manager interface, if the restriction status of the matching contact is designated as either no-texts access or no-calls-and-texts access. Consequently, if the user account is blocked from viewing the incoming text message, then the present invention will send an auto-reply text message to the incoming telephone number. The auto-reply text message contains the access-denial notification so that the sender can read the auto-reply text message and know why their text message was blocked by the user's electronic communication device. Alternatively, the present invention will route the incoming text message to the text manager interface, if the restriction status of the matching contact is designated as full access. Consequently, if the incoming text message is routed to the text manager interface, then the present invention will display the incoming text message through the text manager interface so that the user can view the contents of the incoming text message.

Figure 2:
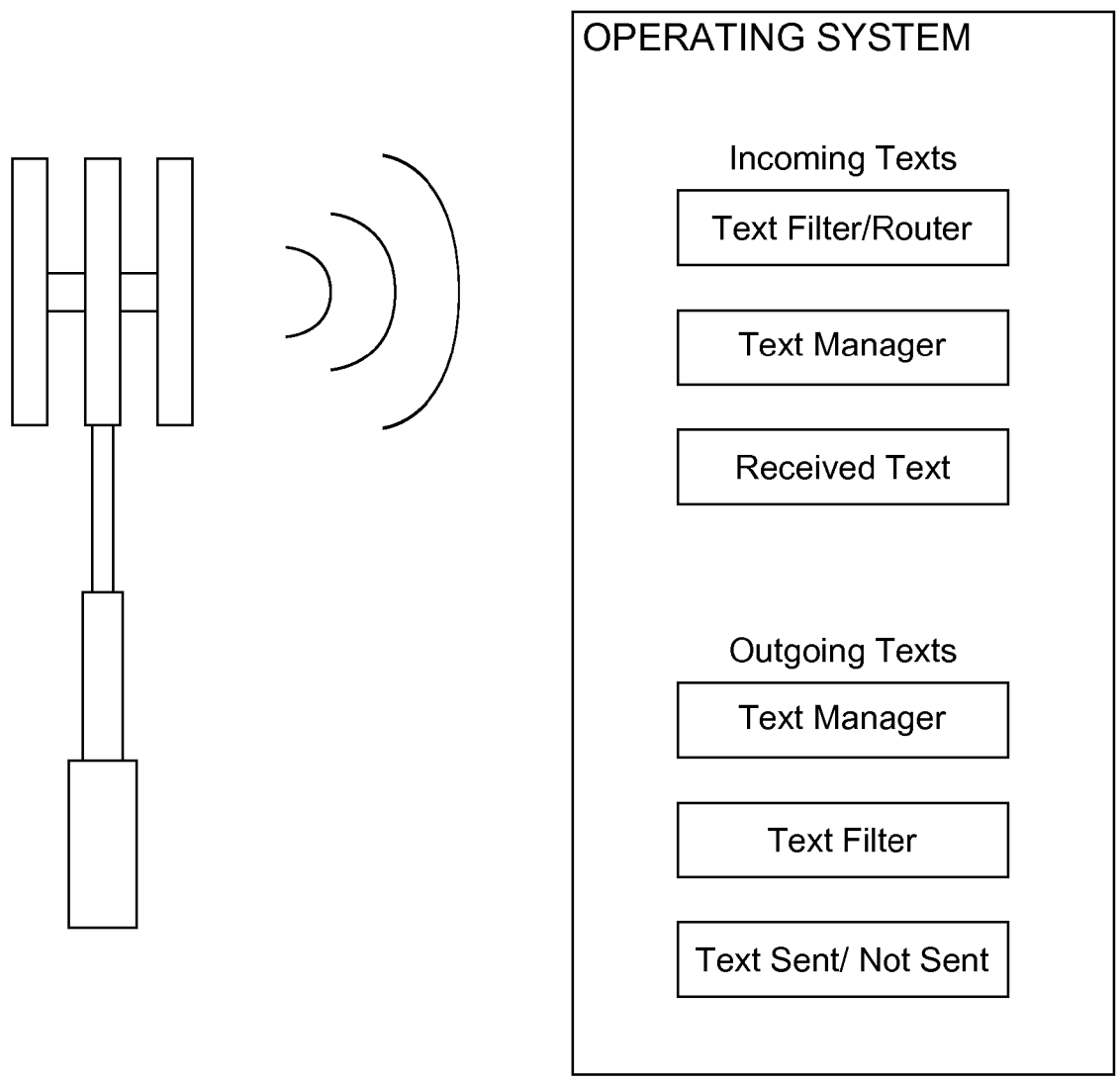
FIG. 2 is a block diagram showing which system components of the present invention are used to handle incoming and outgoing texts.

As can be seen in FIG. 2, the overall process also includes a set of steps to specifically manage an outgoing communication from the user's portable computing device. These set of steps for the present invention are used to setup parental controls for a child/adolescent user of the electronic communication device and to dictate which contacts that the child/adolescent user can communicate with. The outgoing communication can either be a telephone call or a text message that is being transmitted from the user's electronic communication device. The present invention will send the outgoing communication to an outgoing telephone number. The outgoing telephone number is the telephone number dialed by the user to make the outgoing telephone call. The present invention will then compare the outgoing telephone number against the telephone number of each of the plurality of contacts in order to find a matching contact on the blacklist. The matching contact should identify the recipient of the outgoing communication. Next, the present invention will deny transmission of the outgoing communication, if the designation for the matching contact's restriction status does not allow for the outgoing communication. Finally, the present invention will display a transmission-denial notification for the outgoing communication to the user account so that the user is informed that their outgoing communication was not sent to the intended recipient. The manner in which the transmission-denial notification is displayed to the user depends on whether the outgoing communication is a telephone call or a text message.

Figure 4:
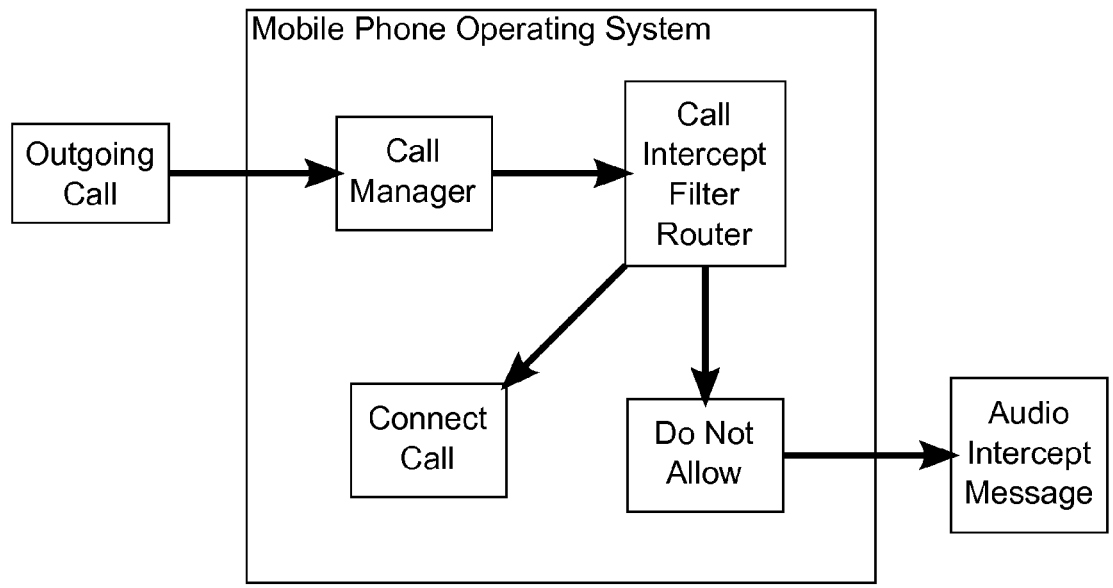
FIG. 4 is a flowchart describing the process of handling outgoing calls.

As can be seen in FIG. 4, the overall process is modified by the present invention in order to specifically manage an outgoing telephone call as the outgoing communication. The present invention will deny transmission of the outgoing telephone call to the outgoing telephone number before the outgoing telephone call reaches the recipient, if the restriction status for the matching contact is designated as either no-calls-and-texts access or no-calls access. Consequently, if the outgoing telephone call is not sent to the outgoing telephone number, then present invention will play an audio intercept message to the user account. The audio intercept message can be played either from the user's electronic communication device or through the external server. In addition, the audio intercept message contains the transmission-denial notification so that the user can hear the transmission-denial notification as their telephone call is not allowed to connect to the recipient's electronic communication device. Alternatively, the present invention will connect the outgoing telephone call to the outgoing telephone number, if the restriction status of the matching contact is designated as full access, which allows the user and the recipient to talk and hear each other during the outgoing telephone call.

Figure 6:
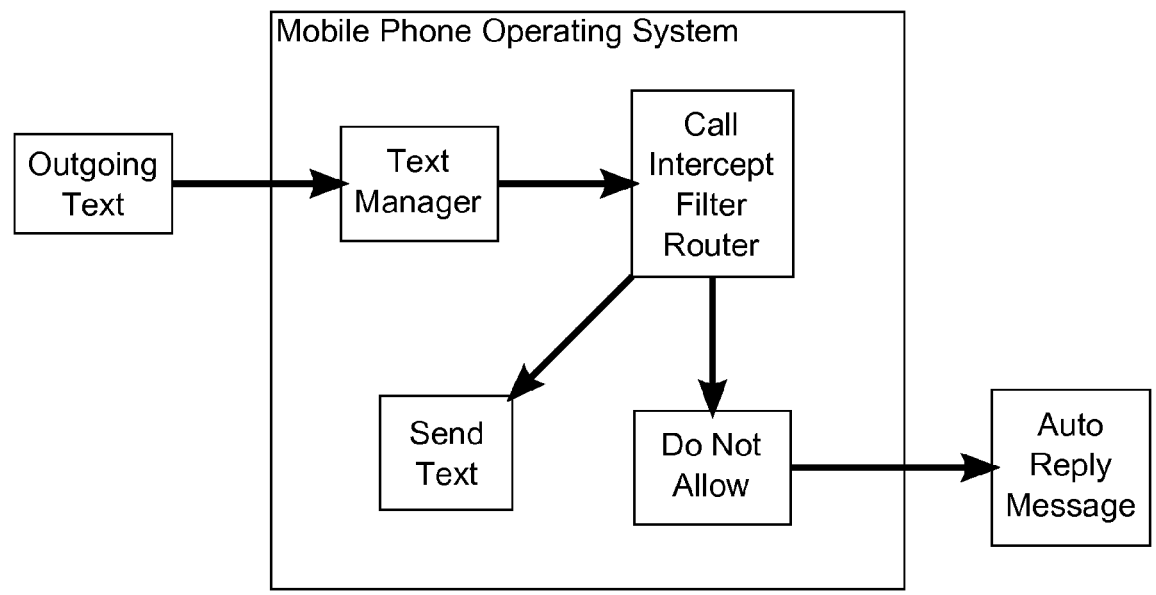
FIG. 6 is a flowchart describing the process of handling outgoing text messages.

As can be seen in FIG. 6, the overall process is also modified by the present invention in order to specifically manage an outgoing text message as the outgoing communication. The present invention will deny transmission of the outgoing text message, if the restriction status of the matching contact is designated as either no-texts access or no-calls-and-texts access. Consequently, if the outgoing text message is not sent to the outgoing telephone number, then the present invention will send an auto-reply text message to the user account. The auto-reply text message contains the transmission-denial notification so that the user can read the auto-reply text message and know why their text message was blocked by present invention. Alternatively, the present invention will send the outgoing text message to the outgoing telephone number, if the restriction status of restriction status of the matching contact is designated as full access, so that the recipient can view the contents of the outgoing text message.

The present invention also executes a set of steps to manage the incoming communication or the outgoing communication from an unknown telephone number. The present invention will recognize an incoming telephone number or an outgoing telephone number as the unknown telephone number because none of the contacts on the blacklist have a telephone number that matches the unknown telephone number. The present invention will then prompt the user account to add an unknown telephone number to the blacklist. Once the user agrees to add the unknown telephone number to the blacklist, the present invention prompts the user account to enter new identification information for the unknown telephone number. Together, the present invention stores the new identification number and the unknown telephone number as a new contact on the blacklist.

Furthermore, the present invention allows the user to setup the content of the audio intercept message or the auto-reply text message. Some examples of different content that could be setup by the user are as follows:

I'm sorry; the number you have reached is not in service, or temporarily disconnected. The number you have reached is not in service at this time. This is a recording.

We're sorry; you have reached a number that has been disconnected or is no longer in service. If you feel you have reached this recording in error, please check the number and try your call again.

The number you have reached, <old number>, has been changed. The new number is <new number>. Please make a note of it. <old number> has been changed. The new number is <new number>.

We're sorry; we are unable to complete your call as dialed. Please check the number and dial again, or call your operator to help you.

Customized content for these messages can be created from celebrities such as comedians and will be available through the present invention at the user's discretion. With the present invention, the user will never have to change their number again and will have the capability to disconnect any phone number indefinitely.

Figure 7:
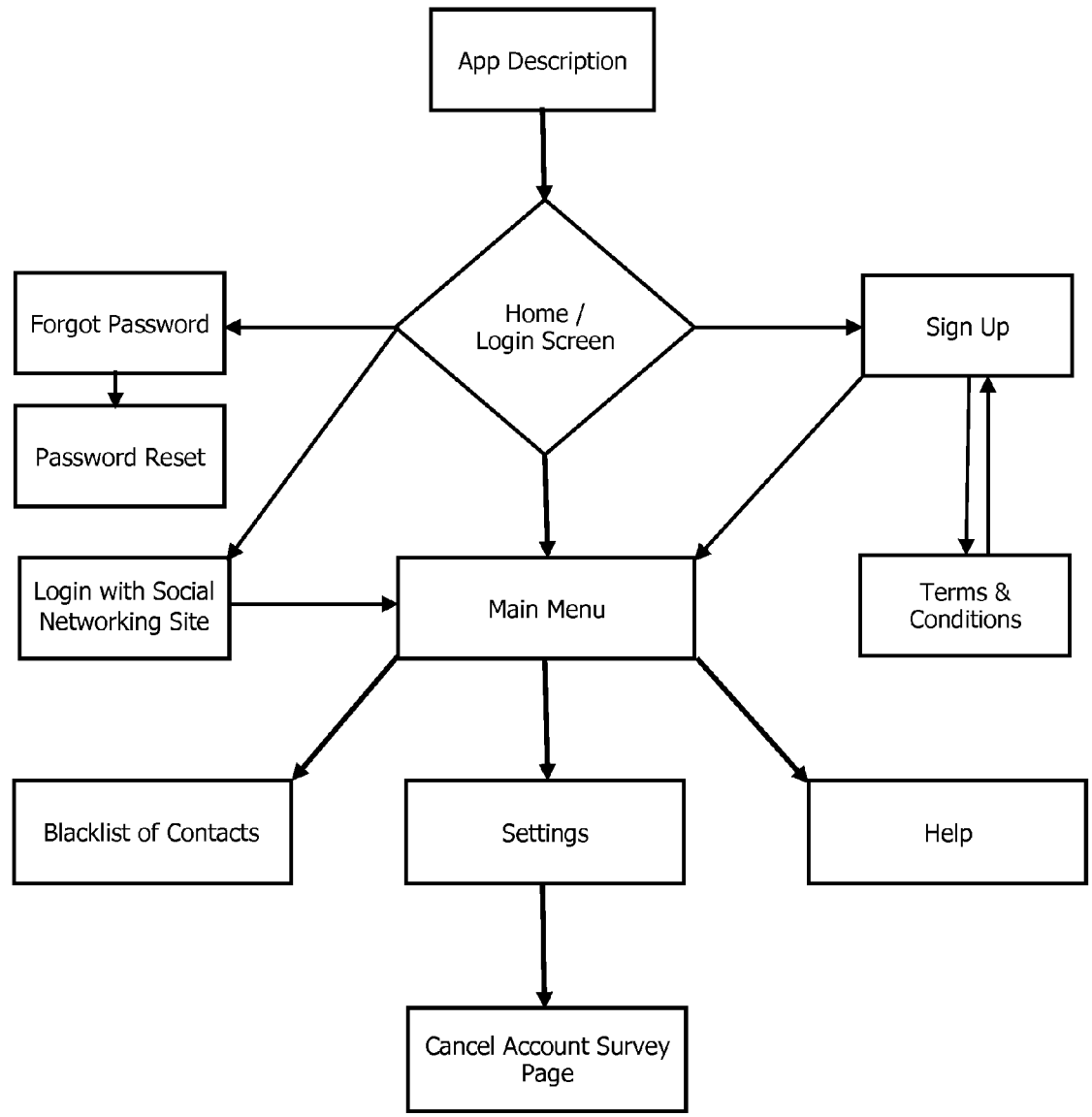
FIG. 7 is a flowchart describing the user interface of the present invention.

As can be seen in FIG. 7, the present invention also includes a set of ancillary features that are implemented in conjunction with the overall process. One such ancillary feature allows the user to access their user account through an external social network website such as Facebook. Another such ancillary feature allows the user to adjust the settings of the present invention such as managing notifications, changing the default language, adjusting the login information, activating the manual disconnect feature for an incoming call, and activating the parental control feature. Another such ancillary feature allows the user to add new contacts from the call manager interface or the text manager interface of their electronic communication device. Another such ancillary feature is to view the call history of a specific contact or the entire call history of their electronic communication device.

Although the invention has been explained in relation to its preferred embodiment, it is to be understood that many other possible modifications and variations can be made without departing from the spirit and scope of the invention as hereinafter claimed.

What is claimed is:

1. A method of intercepting phone calls and text messages from specific contacts by executing computer-executable instructions stored on a non-transitory computer-readable medium, the method comprises the steps of:
providing a user account with a blacklist, wherein said blacklist includes a plurality of contacts;
providing identification information and a telephone number each of said plurality of contacts;
prompting said user account to manage said blacklist by either adding new contacts or deleting current contacts to said blacklist;
prompting said user account to designate a restriction status for each of said plurality of contacts on said blacklist, wherein said restriction status is either no-text access, no-calls-and-texts access, no-calls access, or full access
receiving an incoming communication from an incoming telephone number;
comparing an incoming telephone number against said telephone number of each of said plurality of contacts in order to find a matching sender-contact on said blacklist;
denying access to said incoming communication,
if said restriction status of said matching sender-contact does not allow for said incoming communication;
sending an access-denial notification for said incoming communication to said incoming telephone number;
sending an outgoing communication to an outgoing telephone number;
comparing said outgoing telephone number against said telephone number of each of said plurality of contacts in order to find a matching recipient-contact on said blacklist;
denying transmission of said outgoing communication,
if said restriction status of said matching recipient-contact does not allow for said outgoing communication;
displaying a transmission-denial communication to said user account;
said incoming communication is an incoming telephone call received from a cell tower;
connecting said user account to said incoming telephone call,
if said restriction status of said matching sender-contact is designated as full access; and
routing said incoming telephone call to a call manager interface,
if said user account is connected to said incoming telephone call.

2. The method of intercepting phone calls and text messages from specific contacts by executing computer-executable instructions stored on a non-transitory computer-readable medium, the method as claimed in claim 1 comprises the steps of:
wherein said outgoing communication is an outgoing telephone call received through a call manager interface from said user account;
denying transmission of said outgoing telephone call to said outgoing telephone number,
if said restriction status of said matching recipient-contact is designated as either no-calls-and-texts access or no-calls access; and
playing an audio intercept message to said user account,
if said outgoing telephone call is not sent to said outgoing telephone number,
wherein said audio intercept message contains said transmission-denial notification.

3. The method of intercepting phone calls and text messages from specific contacts by executing computer-executable instructions stored on a non-transitory computer-readable medium, the method as claimed in claim 1 further comprises the steps of:
wherein said outgoing communication is an outgoing telephone call received through a call manager interface from said user account; and
connecting said outgoing telephone call to said outgoing telephone number,
if said restriction status of said matching recipient-contact is designated as full access.

4. The method of intercepting phone calls and text messages from specific contacts by executing computer-executable instructions stored on a non-transitory computer-readable medium, the method as claimed in claim 1 comprises the steps of:
wherein said outgoing communication is an outgoing text message received through a text manager interface from said user account;
denying transmission of said outgoing text message to said outgoing telephone number,
if said restriction status of said matching recipient-contact is designated as either no-texts access or no-calls-and-texts access; and
sending an auto-reply text message to said user account,
if said outgoing text message is not sent to said outgoing telephone number,
wherein said auto-reply text message contains said transmission-denial notification.

5. The method of intercepting phone calls and text messages from specific contacts by executing computer-executable instructions stored on a non-transitory computer-readable medium, the method as claimed in claim 1 further comprises the steps of:

wherein said outgoing communication is an outgoing text message received through a text manager interface from said user account; and sending said outgoing text message to said outgoing telephone number, if said restriction status of said matching recipient-contact is designated as full access.

6. The method of intercepting phone calls and text messages from specific contacts by executing computer-executable instructions stored on a non-transitory computer-readable medium, the method as claimed in claim 1 further comprises the steps of:

recognizing said incoming telephone number or said outgoing telephone number as an unknown telephone number;

prompting said user account to add an unknown telephone number to said blacklist;

prompting said user account to enter new identification information for said unknown telephone number; and storing said new identification information and said unknown telephone number as a new contact on said blacklist.

7. A method of intercepting phone calls and text messages from specific contacts by executing computer-executable instructions stored on a non-transitory computer-readable medium, the method comprises the steps of:

providing a user account with a blacklist, wherein said blacklist includes a plurality of contacts;

providing identification information and a telephone number each of said plurality of contacts;

prompting said user account to manage said blacklist by either adding new contacts or deleting current contacts to said blacklist;

prompting said user account to designate a restriction status for each of said plurality of contacts on said blacklist, wherein said restriction status is either no-text access, no-calls-and-texts access, no-calls access, or full access receiving an incoming communication from an incoming telephone number;

comparing an incoming telephone number against said telephone number of each of said plurality of contacts in order to find a matching sender-contact on said blacklist;

denying access to said incoming communication, if said restriction status of said matching sender-contact does not allow for said incoming communication;

sending an access-denial notification for said incoming communication to said incoming telephone number;

sending an outgoing communication to an outgoing telephone number;

comparing said outgoing telephone number against said telephone number of each of said plurality of contacts in order to find a matching recipient-contact on said blacklist;

denying transmission of said outgoing communication, if said restriction status of said matching recipient-contact does not allow for said outgoing communication;

displaying a transmission-denial communication to said user account;

said incoming communication is an incoming text message received from a cell tower;

routing said incoming text message to a text manager interface, if said restriction status of said matching sender-contact is designated as full access; and displaying said incoming text message to said user account through said text manager interface, if said incoming text message is routed to said text manager interface.

8. The method of intercepting phone calls and text messages from specific contacts by executing computer-executable instructions stored on a non-transitory computer-readable medium, the method as claimed in claim 7 comprises the steps of:

wherein said outgoing communication is an outgoing telephone call received through a call manager interface from said user account;

denying transmission of said outgoing telephone call to said outgoing telephone number, if said restriction status of said matching recipient-contact is designated as either no-calls-and-texts access or no-calls access; and playing an audio intercept message to said user account, if said outgoing telephone call is not sent to said outgoing telephone number, wherein said audio intercept message contains said transmission-denial notification.

9. The method of intercepting phone calls and text messages from specific contacts by executing computer-executable instructions stored on a non-transitory computer-readable medium, the method as claimed in claim 7 further comprises the steps of:

wherein said outgoing communication is an outgoing telephone call received through a call manager interface from said user account; and connecting said outgoing telephone call to said outgoing telephone number, if said restriction status of said matching recipient-contact is designated as full access.

10. The method of intercepting phone calls and text messages from specific contacts by executing computer-executable instructions stored on a non-transitory computer-readable medium, the method as claimed in claim 7 comprises the steps of:

wherein said outgoing communication is an outgoing text message received through a text manager interface from said user account;

denying transmission of said outgoing text message to said outgoing telephone number, if said restriction status of said matching recipient-contact is designated as either no-texts access or no-calls-and-texts access; and sending an auto-reply text message to said user account, if said outgoing text message is not sent to said outgoing telephone number, wherein said auto-reply text message contains said transmission-denial notification.

11. The method of intercepting phone calls and text messages from specific contacts by executing computer-executable instructions stored on a non-transitory computer-readable medium, the method as claimed in claim 7 further comprises the steps of:

wherein said outgoing communication is an outgoing text message received through a text manager interface from said user account; and sending said outgoing text message to said outgoing telephone number, if said restriction status of said matching recipient-contact is designated as full access.

12. The method of intercepting phone calls and text messages from specific contacts by executing computer-executable instructions stored on a non-transitory computer-readable medium, the method as claimed in claim 7 further comprises the steps of:

recognizing said incoming telephone number or said outgoing telephone number as an unknown telephone number;

prompting said user account to add an unknown telephone number to said blacklist;

prompting said user account to enter new identification information for said unknown telephone number; and storing said new identification information and said unknown telephone number as a new contact on said blacklist.

13. A method of intercepting phone calls and text messages from specific contacts by executing computer-executable instructions stored on a non-transitory computer-readable medium, the method comprises the steps of:
provingidg a user account with a blacklist, wherein said blacklist includes a plurality of contacts;
providing identification information and a telephone number each of said plurality of contacts;
prompting said user account to manage said blacklist by either adding new contacts or deleting current contacts to said blacklist;
prompting said user account to designate a restriction status for each of said plurality of contacts on said blacklist, wherein said restriction status is either no-text access, no-calls-and-texts access, no-calls access, or full access
receiving an incoming communication from an incoming telephone number;
comparing an incoming telephone number against said telephone number of each of said plurality of contacts in order to find a matching sender-contact on said blacklist;
denying access to said incoming communication,
if said restriction status of said matching sender-contact does not allow for said incoming communication;
sending an access-denial notification for said incoming communication to said incoming telephone number;
sending an outgoing communication to an outgoing telephone number;
comparing said outgoing telephone number against said telephone number of each of said plurality of contacts in order to find a matching recipient-contact on said blacklist;
denying transmission of said outgoing communication,
if said restriction status of said matching recipient-contact does not allow for said outgoing communication;
displaying a transmission-denial communication to said user account;
said outgoing communication is an outgoing telephone call received through a call manager interface from said user account; and
connecting said outgoing telephone call to said outgoing telephone number,
if said restriction status of said matching recipient-contact is designated as full access.

14. The method of intercepting phone calls and text messages from specific contacts by executing computer-executable instructions stored on a non-transitory computer-readable medium, the method as claimed in claim 13 comprises the steps of:
wherein said incoming communication is an incoming telephone call received from a cell tower;
disconnecting said user account from said incoming telephone call,
if said restriction status of said matching sender-contact is designated as either no-calls-and-texts access or no-calls access; and
sending an audio intercept message to said incoming telephone number,
if said user account is disconnected from said incoming telephone call,
wherein said audio intercept message contains said access-denial notification.

15. The method of intercepting phone calls and text messages from specific contacts by executing computer-executable instructions stored on a non-transitory computer-readable medium, the method as claimed in claim 13 further comprises the steps of:
wherein said incoming communication is an incoming telephone call received from a cell tower;
connecting said user account to said incoming telephone call,
if said restriction status of said matching sender-contact is designated as full access; and
routing said incoming telephone call to a call manager interface,
if said user account is connected to said incoming telephone call.

16. The method of intercepting phone calls and text messages from specific contacts by executing computer-executable instructions stored on a non-transitory computer-readable medium, the method as claimed in claim 13 comprises the steps of:
wherein said incoming communication is an incoming text message received from a cell tower;
blocking said user account from viewing said incoming text message,
if said restriction status of said matching sender-contact is designated as either no-texts access or no-calls-and-texts access; and
sending an auto-reply text message to said incoming telephone number,
if said user account is blocked from viewing said incoming text message,
wherein said auto-reply text message contains said access-denial notification.

17. The method of intercepting phone calls and text messages from specific contacts by executing computer-executable instructions stored on a non-transitory computer-readable medium, the method as claimed in claim 13 further comprises the steps of:
wherein said incoming communication is an incoming text message received from a cell tower;
routing said incoming text message to a text manager interface,
if said restriction status of said matching sender-contact is designated as full access; and
displaying said incoming text message to said user account through said text manager interface,
if said incoming text message is routed to said text manager interface.

18. The method of intercepting phone calls and text messages from specific contacts by executing computer-executable instructions stored on a non-transitory computer-readable medium, the method as claimed in claim 13 further comprises the steps of:
recognizing said incoming telephone number or said outgoing telephone number as an unknown telephone number;
prompting said user account to add an unknown telephone number to said blacklist;
prompting said user account to enter new identification information for said unknown telephone number; and
storing said new identification information and said unknown telephone number as a new contact on said blacklist.

* * * * *